United States Patent [19]

Kudo et al.

[11] Patent Number: 4,983,026

[45] Date of Patent: Jan. 8, 1991

[54] FOCAL LENGTH CHANGEABLE LENS SYSTEM

[75] Inventors: Yoshinobu Kudo; Kazuo Kimura, both of Sakai, Japan

[73] Assignee: Minolta Camera Kabushiki Kaisha, Osaka, Japan

[21] Appl. No.: 137,518

[22] Filed: Dec. 22, 1987

[30] Foreign Application Priority Data

Dec. 27, 1986 [JP] Japan .................. 61-311448

[51] Int. Cl.$^5$ ............................................. G02B 15/08
[52] U.S. Cl. .................................................. 350/422
[58] Field of Search ......................................... 350/422

[56] References Cited

U.S. PATENT DOCUMENTS

| | | | |
|---|---|---|---|
| 4,148,548 | 4/1979 | Thompson | 350/422 X |
| 4,469,396 | 9/1984 | Neil | 350/422 X |
| 4,653,872 | 3/1987 | Takahashi | 350/427 |
| 4,715,693 | 12/1987 | Takasa et al. | 350/422 |
| 4,768,868 | 9/1988 | Wakamiya et al. | 350/422 X |

FOREIGN PATENT DOCUMENTS

| | | |
|---|---|---|
| 55-143518 | 11/1980 | Japan . |
| 56-94318 | 7/1981 | Japan . |
| 56-99313 | 8/1981 | Japan . |
| 59-13211 | 1/1984 | Japan . |
| 59-13212 | 1/1984 | Japan . |
| 59-152413 | 8/1984 | Japan . |
| 61-38920 | 2/1986 | Japan . |
| 61-1299612 | 6/1986 | Japan . |
| 62-92908 | 4/1987 | Japan . |
| 62-105112 | 5/1987 | Japan . |

OTHER PUBLICATIONS

David S. Grey, Athermalization of Optical Sysems, Journal of the Optical Society of America, Jun. 1945, pp. 542–546.

*Primary Examiner*—Scott J. Sugarman
*Attorney, Agent, or Firm*—Price, Gess & Ubell

[57] ABSTRACT

The present invention provides a focal length changeable lens system which comprises a master lens group of a positive refractive power having at least one negative lens element made of a synthetic resin material; and a rear conversion lens group of a negative refractive power retractably arranged on the image side of the master lens group and having at least one positive lens element made of a synthetic resin material, in order to well compensate the change of back focal length of the lens system due to the change in temperature thereof without increasing the cost of the lens system.

6 Claims, 11 Drawing Sheets

Spherical
Aberration

Astigmatism

Distortion (%)

Spherical
Aberration

Astigmatism

Distortion (%)

Spherical
Aberration

Astigmatism

Distortion (%)

Spherical Aberration

Astigmatism

Distortion (%)

Spherical Aberration

Astigmatism

Distortion (%)

FNO 2.6

—— d

-0.5  0.5
Spherical
Aberration

ω=31.7°

---- DM
—— DS

-0.5  0.5
Astigmatism

ω=31.7°

-5.0  5.0
Distortion (%)

FNO 5.0

-0.5　0.5
Spherical
Aberration

ω=17.65°

-0.5　0.5
Astigmatism

---- DM
—— DS

ω=17.65°

-5.0　5.0
Distortion (%)

FNO 4.0

—— d

-0.5  0.5
Spherical
Aberration

ω=22.0°

---- DM
—— DS

-0.5  0.5
Astigmatism

ω=22.0°

-5.0  5.0
Distortion (%)

FOCAL LENGTH CHANGEABLE LENS SYSTEM

BACKGROUND OF THE INVENTION

1. Field of the Invention

The present invention relates to a photographic lens system, and more particularly to a focal length changeable lens system in which the focal length of the photographic lens system can be changed by inserting and retracting a rear conversion lens group on the image side of a master lens group.

2. Description of the Prior Art

Conventionally, it has been considered to apply a lens element made of a synthetic resin material to an element in a lens system for decreasing the manufacturing cost of the lens system. However, such a lens system including at least one lens element made of a synthetic resin material has a drawback that the position of image plane of the lens system changes due to the fact that the back focal length of the lens system changes with a change in temperature Such a drawback also occurs in a focal length changeable lens system in which the focal length of the photographic lens system can be changed by inserting and retracting a rear conversion lens group on the image side of a master lens group. In such focal length changeable lens system, the position of image plane changes seriously in the long focal length condition when the rear conversion lens group is inserted behind the master lens group.

In a focal length changeable lens system in which the master lens group includes at least one lens element made of a synthetic resin material, and in which the rear conversion lens group has no lens element made of a synthetic resin material, the change of back focal length $\Delta L_{BT}$, in the long focal length condition in which the rear conversion lens group is inserted behind the master lens group, is represented as follows:

$$\Delta L_{BT} = \Delta L_B \times M^2 \tag{A}$$

wherein; $\Delta L_B$ represents the change of the back focal length of the master lens group with the change in temperature, that is, the change of the back focal length of the lens system a short focal length condition in which the rear conversion lens group is retracted from the optical axis of the lens system, and M represents the magnification of the rear conversion lens group. Namely, even if the change of the back focal length in the short focal length condition is controlled within a permissible range, the change of the back focal length in the long focal length condition may violate the permissible range. Such a change may be significant when the magnification of the rear conversion lens group is considerably large. In the long focal length condition, errors in manufacturing the master lens group, errors in manufacturing the rear conversion lens group, and errors in position of the rear conversion lens group relative to the master lens group influence the change of the back focal length of the whole lens system. Therefore, the back focal length of the whole lens system changes significantly in the long focal length condition with a change in temperature.

In the above-identified focal length changeable lens system, another approach has been considered for decreasing the change of the back focal length of the whole lens system due to the change in temperature. Such an approach is to design the master lens group so that the change of back focal length in the master lens group is controlled to almost zero and to design the rear conversion lens group so that the change of the back focal length in the rear conversion lens group is also controlled to almost zero, respectively. However, if such an approach is applied to the design of a lens system, both of the constructions of the master lens group and that of the rear conversion lens group become complex, because of an increase in the number of lens elements in both of the lens groups.

Further another approach is considered for decreasing the change of the back focal length of the whole lens system due to the change in temperature. Such an approach is to compensate the change of back focal length of the whole lens system in the camera body side. However, if such an approach is applied to design a camera body, the construction of the camera body becomes more complex.

SUMMARY OF THE INVENTION

An object of the present invention is to provide a focal length changeable lens system, in which the focal length of the photographic lens system can be changed by inserting and retracting a rear conversion lens group on the image side of a master lens group, while compensating the change of back focal length of the lens system due to the change in temperature without increasing the cost of the lens system.

The other object of the present invention is to provide such a lens system in which the master lens group includes at least one lens element made of a synthetic resin material, and in which the rear conversion lens group also includes at least one lens element made of a synthetic resin material.

Further objects of the present invention are to provide such a lens system in which the change of back focal length produced in the master lens group is well compensated and cancelled by the change of back focal length produced in the rear conversion lens group.

To achieve the above objects, according to the present invention, a focal length changeable lens system comprises a master lens group of a positive refractive power having at least one negative lens element made of a synthetic resin material; and a rear conversion lens group of a negative refractive power retractably arranged on the image side of the master lens group and having at least one positive lens element made of a synthetic resin material.

DETAILED DESCRIPTION OF THE PREFERRED EMBODIMENTS

Figure 1:
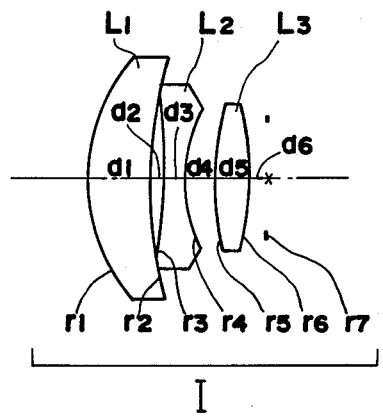
FIG. 1 represents a cross sectional view of the first embodiment according to the present invention in a short focal length condition.
Figure 2A:
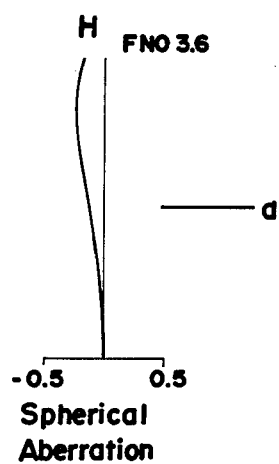
FIGS. 2a to 2c represent the aberration curves of the first embodiment in a short focal length condition.
Figure 2B:
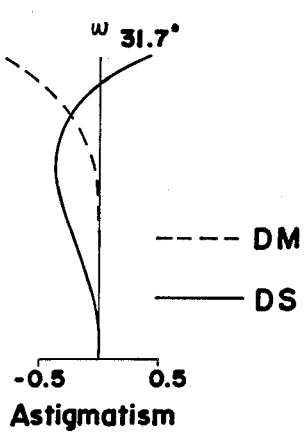
Figure 2C:
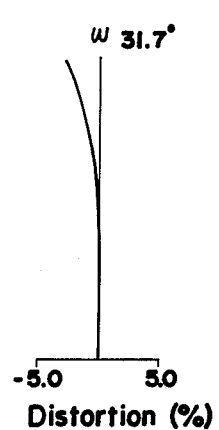

The following description is provided to enable any person skilled in the optical and camera field to make and use the invention and sets forth the best modes contemplated by the inventors for carrying out their invention. Various modification, however, will remain readily apparent to those skilled in the art, since the generic principles of the present invention have been defined herein specifically to provide a relatively economical and easily manufactured compact lens system. The deviation of the formulas and the relation of the powers set forth herein can be accomplished with the assistance of a computer. The present invention represents the parameters of a compromise balance of acceptable aberrations which can be relatively easily manufactured to provide a low cost lens system for utilization with a 35mm lens-shutter type camera.

In the drawings, schematic cross sectional views disclose the position of the lens groups and the lens elements in the long and short focal length condition.

Figure 3:
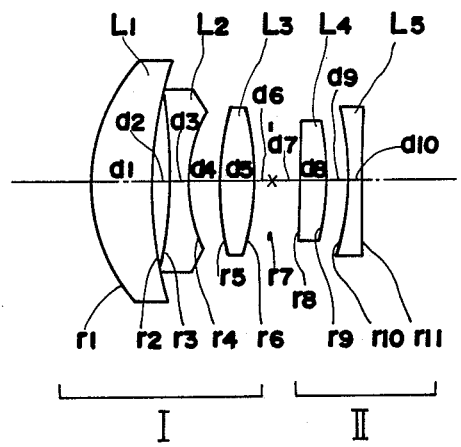
FIG. 3 represents a cross sectional view of the first embodiment according to the present invention in a long focal length condition.
Figure 4A:
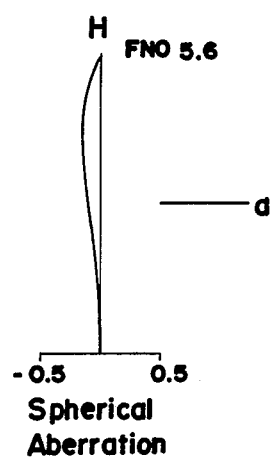
FIGS. 4a to 4c represent the aberration curves of the first embodiment in a long focal length condition.
Figure 4B:
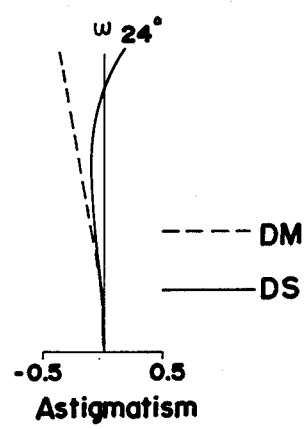
Figure 4C:
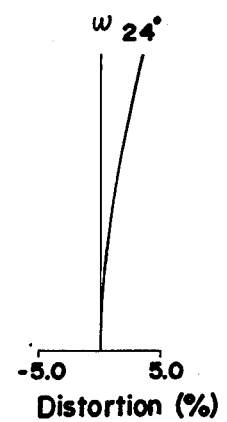
Figure 5:
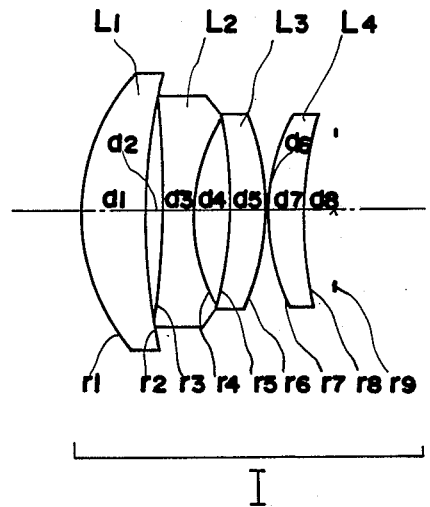
FIG. 5 represents a cross sectional view of the second embodiment according to the present invention in a short focal length condition.
Figure 6A:
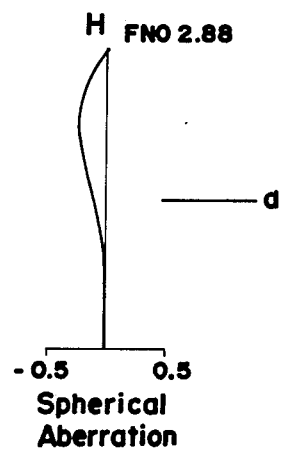
FIGS. 6a to 6c represent the aberration curves of the second embodiment in a short focal length condition.
Figure 6B:
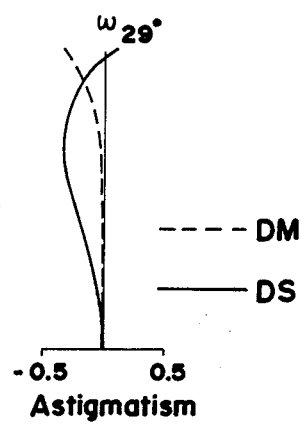
Figure 6C:
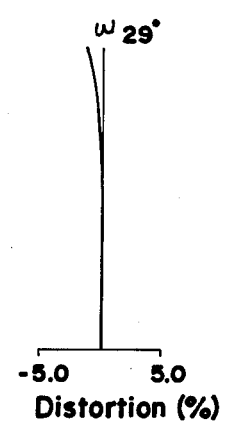
Figure 7:
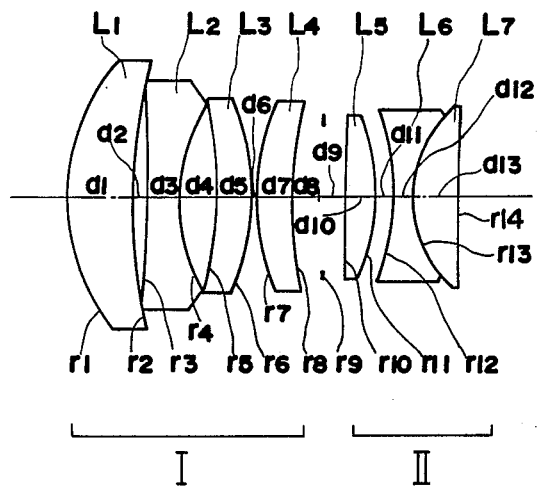
FIG. 7 represents a cross sectional view of the second embodiment according to the present invention in a long focal length condition.
Figure 8A:
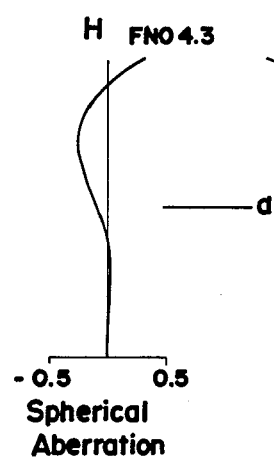
FIGS. 8a to 8c represent the aberration curves of the second embodiment in a long focal length condition.
Figure 8B:
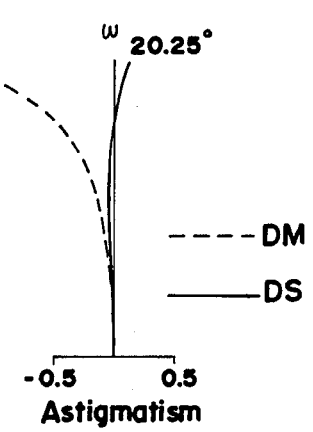
Figure 8C:
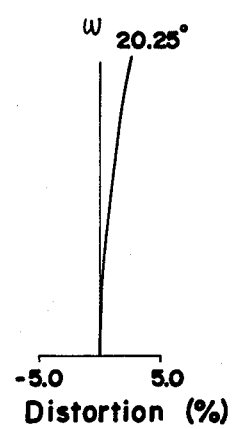
Figure 9:
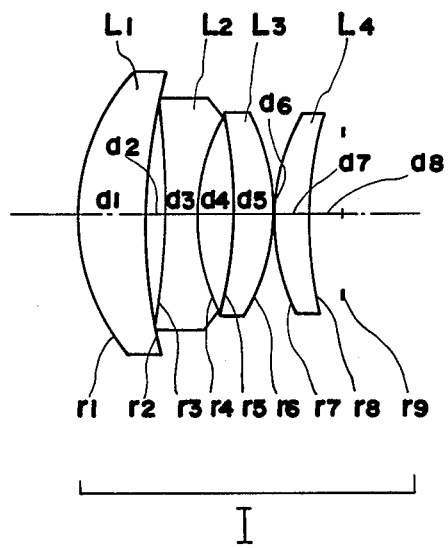
FIG. 9 represents a cross sectional view of the third embodiment according to the present invention in a short focal length condition.
Figure 10A:
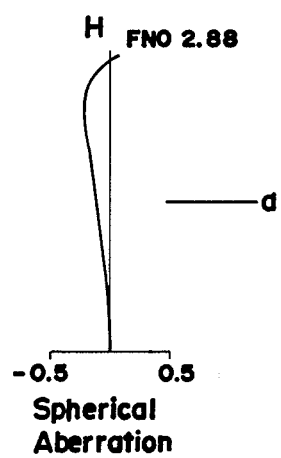
FIGS. 10a to 10c represent the aberration curves of the third embodiment in a short focal length condition.
Figure 10B:
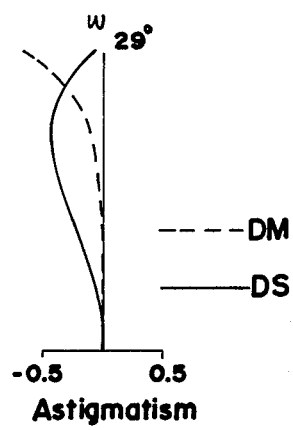
Figure 10C:
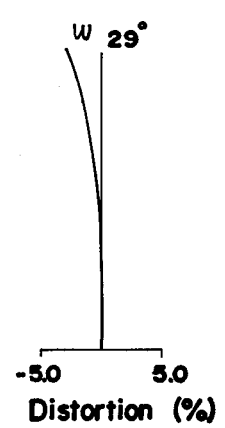
Figure 11:
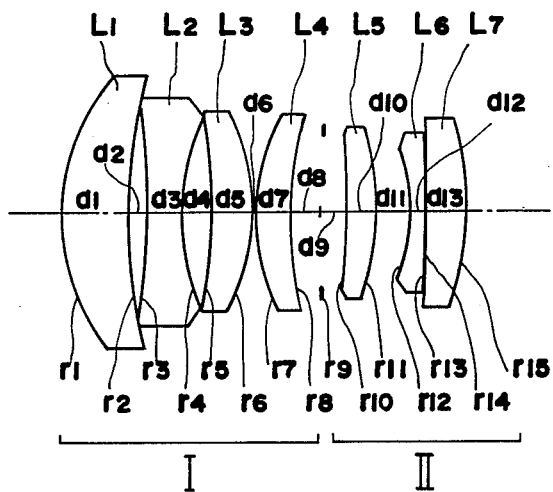
FIG. 11 represents a cross sectional view of the third embodiment according to the present invention in a long focal length condition.
Figure 12A:
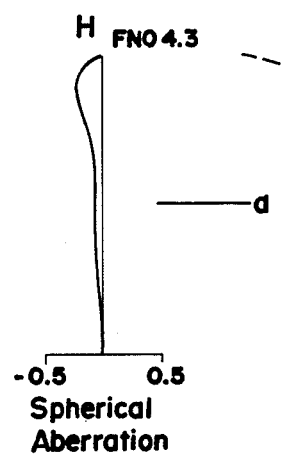
FIGS. 12a to 12c represent the aberration curves of the third embodiment in a long focal length condition.
Figure 12B:
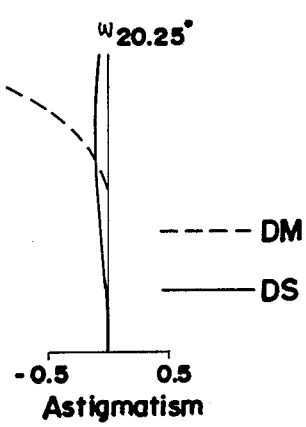
Figure 12C:
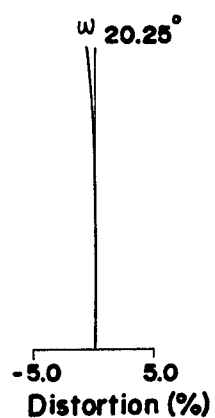
Figure 13:
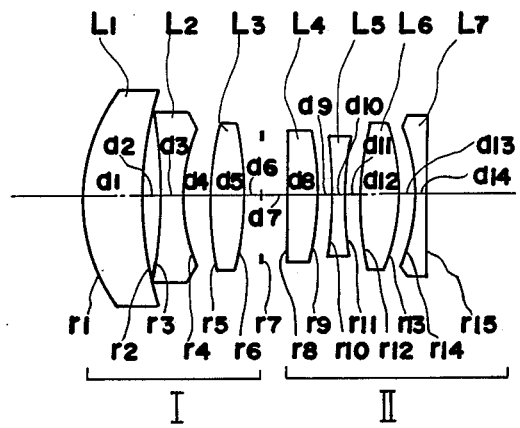
FIG. 13 represents a cross sectional view of the fourth embodiment according to the present invention in a long focal length condition.
Figures 14A, 14B, 14C:
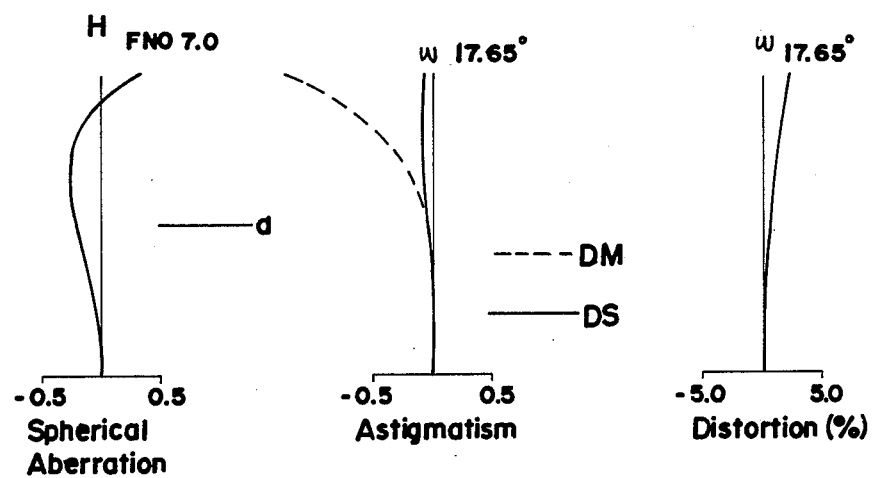
FIGS. 14a to 14c represent the aberration curves of the fourth embodiment in a long focal length condition.
Figure 15:
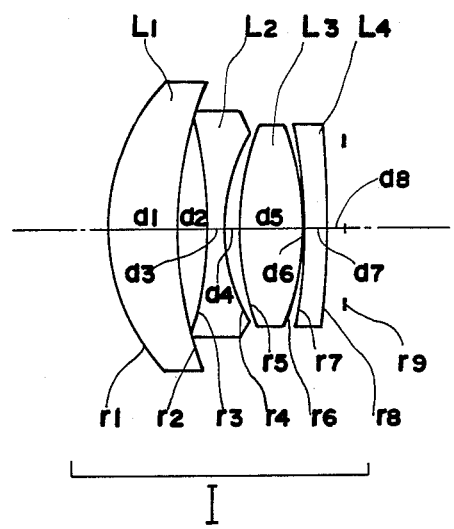
FIG. 15 represents a cross sectional view of the fifth embodiment according to the present invention in a short focal length condition.
Figure 16A:
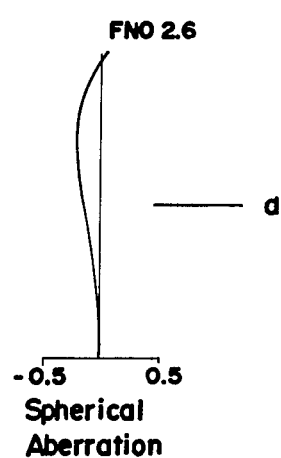
FIGS. 16a to 16c represent the aberration curves of the fifth embodiment in a short focal length condition.
Figure 16B:
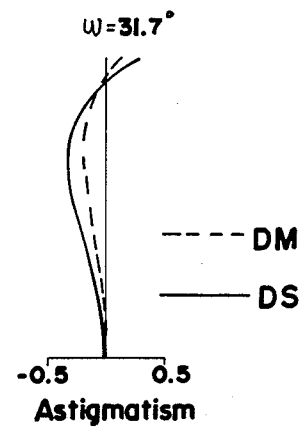
Figure 16C:
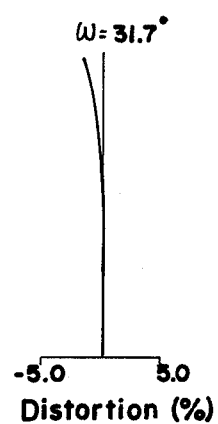
Figure 17:
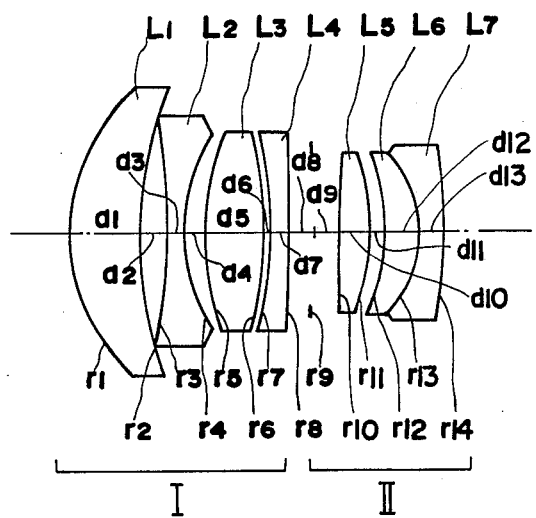
FIG. 17 represents a cross sectional view of the fifth embodiment according to the present invention in long focal length condition.
Figure 18A:
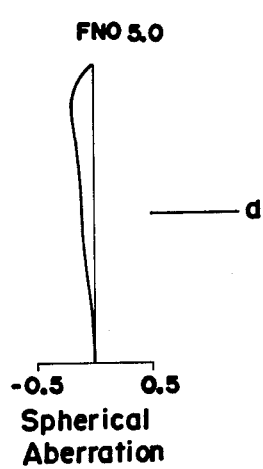
FIGS. 18a to 18c represent the aberration curves of the fifth embodiment in long focal length condition.
Figure 18B:
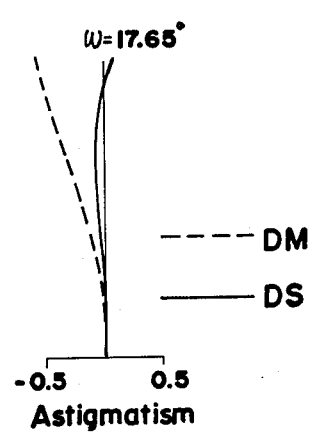
Figure 18C:
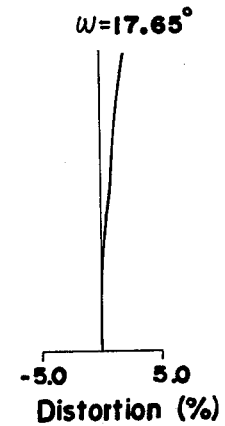
Figure 19:
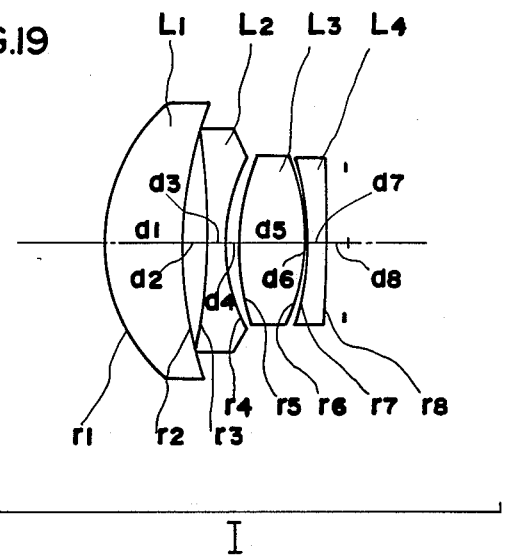
FIG. 19 represents a cross sectional view of the sixth embodiment according to the present invention in short focal length condition.
Figure 20A:
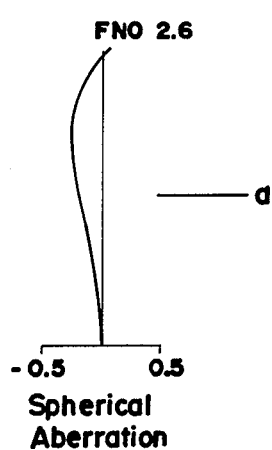
FIGS. 20a to 20c represent the aberration curves of the sixth embodiment in a short focal length condition.
Figure 20B:
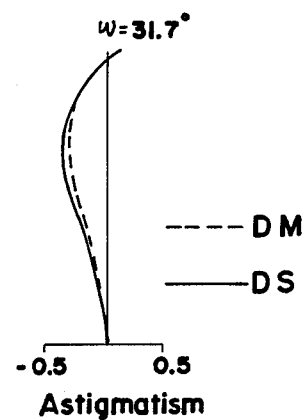
Figure 20C:
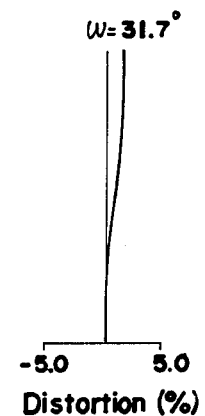
Figure 21:
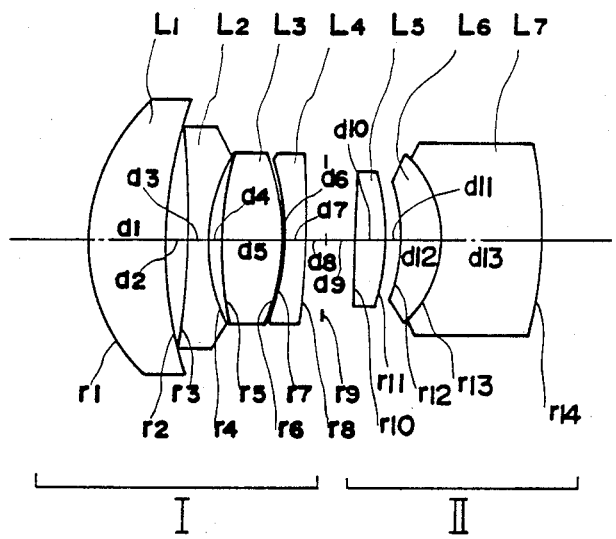
FIG. 21 represents a cross sectional view of the sixth embodiment according to the present invention in a long focal length condition.
Figure 22A:
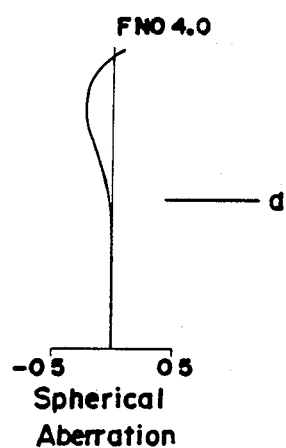
FIGS. 22a to 22c represent the aberration curves of the sixth embodiment in a long focal length condition.
Figure 22B:
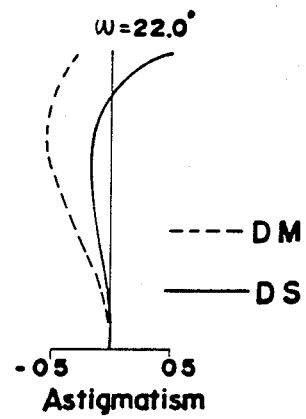
Figure 22C:
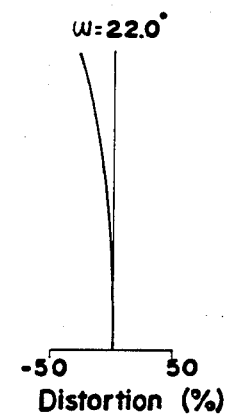

As shown in FIGS. 3, 7, 11, 13, 17, and 21, the present invention provides a focal length changeable lens system comprising a master lens group (I) of a positive refractive power having at least one negative lens element made of a synthetic resin material; and a rear conversion lens group (II) of a negative refractive power retractably arranged on the image side of the master lens group and having at least one positive lens element made of a synthetic resin material.

According to the present invention, at least one lens element made of a synthetic resin material is introduced into the rear conversion lens group for producing a change of back focal length of the rear conversion lens group whose sign is opposite to the sign of a change of back focal length of the master lens group, with respect to a predetermined change in temperature. It is effective not only for cancelling the change of back focal length of the master lens group due to the change in temperature, but also for cancelling the change of axial length of the camera body due to the change in temperature.

Here, it is desirable to provide a design so that a negative lens element made of a synthetic resin material is included in the master lens group, while a positive lens element made of a synthetic resin material is included in the rear conversion lens group. For example, a focal length changeable lens system having the following construction will be considered;

a master lens group having, from the object side, a first positive lens element made of a glass material, a second negative lens element made of a synthetic resin material, and a third positive lens element made of a synthetic resin material, wherein the compound refractive power of the second and third lens elements is negative; and a rear conversion lens group having, from the object side, a fourth positive lens element made of a synthetic resin material, and a fifth negative lens element made of a glass material.

If a negative lens element made of a synthetic resin material is applied to the rear conversion lens group, the Petzval sum of the rear conversion lens group becomes a large absolute value having a negative sign, since the refractive power of the synthetic resin material is low, in the case where the magnification of a rear conversion lens system is relatively large, that is, the focal length thereof is relatively short. Therefore, the field curvature becomes large. Thus, it is desirable to apply a positive lens element made of a synthetic resin material to the rear conversion lens group.

On the other hand, the following consideration is effective for decreasing the change in position of the image plane due to the change in temperature. With reference to an analysis described in "Athermalization of Optical Systems" by David S. Gray (Journal of the Optical Society of America, volume 38, number 6, June 1948), the change in position of the image plane L due to the change in temperature is represented as follows:

$$L = \left| \sum_{i=1}^{N} (h_i^2/f_i w_i) \right| \quad (B)$$

wherein, N represents the number of lens elements included in the lens system; $f_i$ represents the focal length of i-th lens elements; $h_i$ represents the height of paraxial light incident on i-th lens elements; and $w_i$ represents the thermal nu value of i-th lens element represented by:

$$w_i = \{n_i(T) - 1\} / \{n_i(T_1) - n_i(T_2)\} \quad (C)$$

wherein, $n_i(T)$, $n_i(T_1)$, and $n_i(T_2)$ represent the refractive indices of i-th lens element in temperature T, $T_1$, and $T_2$, respectively. Here, the relationship $T_1 < T < T_2$ is established. In the equation (B), the change in position of the image plane decreases with decrease of the value L.

In the above-described focal length changeable lens system, the change in a position of the image plane in short focal length condition $L_M$ and that in a long focal length condition $L_T$ are represented as follows:

$$L_M = (h_2^2/f_2 w_2) + (h_3^2/f_3 w_3) \quad (D)$$

$$L_T = (h_2^2/f_2 w_2) + (h_3^2/f_3 w_3) + (h_4^2/f_4 w_4) \quad (E)$$

Since the first and fifth lens elements are made of glass materials, the thermal nu values thereof are considerably larger than that of the second, third, and fourth lens elements made of synthetic resin materials. Therefore, the change of refractive powers of the first and fifth lens elements can be neglected.

Here, the third term of the equation (E) is positive, since it relates to the fourth synthetic resin lens element having a positive refractive power. Therefore, the value $L_M$ should have a negative value for decreasing the value $L_T$. The change of position of an image plane with temperature can be controlled within a permissible range in both of the short and long focal length conditions, by means of controlling the value $L_T$ in the long focal length condition within a predetermined standard range with balancing the value $L_M$ and the third term of the equation (E), in addition to controlling the value $L_M$ in the short focal length condition within a predetermined standard range.

In the present invention, it is desirable to fulfill the following condition:

$$-0.3 > \phi_b/\phi_R > -4.0 \quad (1)$$

$$-0.1 > \phi_a/\phi_M > -0.7 \quad (2)$$

wherein, $\phi_a$ represents the refractive power of the lens element made of synthetic resin material included in the master lens group (I), $\phi_b$ represents the refractive power of the lens element made of synthetic resin material included in the rear conversion lens group (II), $\phi_M$ represents the refractive power of the master lens group (I), and $\phi_R$ represents the refractive power of the lens element made of synthetic resin material included in the rear conversion lens group (II).

In conditions in which the magnification of the rear conversion lens group (II) is relatively large, that is, the focal length thereof is relatively short, the compound refractive power of the positive lens elements made of synthetic resin materials in the rear conversion lens group having a negative refractive power, should be set to a predetermined range for substantially compensating the Petzval sum of the lens system by increasing the Petzval sum which is liable to have a large absolute value of a negative sign. If the upper limit of the condition (1) is violated, the value of the third term of the equation (E) becomes too small so that the change in position of the image plane produced in the master lens group with temperature can not be substantially cancelled by that produced in the rear conversion lens group. Therefore, the Petzval sum of the lens system has a large absolute value of a negative sign undesirably. On the other hand, if the lower limit of the condition (1) is violated, the change in position of the image plane produced in the master lens group with temperature is excessively corrected by that produced in the rear conversion lens group. Additionally, the negative refractive power of the rear conversion lens group should be increased for obtaining a relatively large magnification, causing the deterioration of aberrations, since both of the lens groups have strong refractive powers.

The condition (2) defines the refractive power of the lens element made of synthetic resin material in the master lens group. If the upper limit of the condition (2) is violated, the change in position of the image plane produced by the rear conversion lens group (II) designed with fulfilling the condition (1) becomes too large in the positive direction in the long focal length condition, although the change in position of the image plane produced by the master lens group (I) can be controlled within a small range. If the lower limit of the condition (2) is violated, the change in position of the image plane produced by the master lens group (I) becomes too large to compensate well.

The following tables 1 to 6 disclose, respectively, the first through sixth embodiments of the present invention. In the Tables, f equals the focal length, $2\omega$ equals the field angle, $F_{NO}$ equals the F-number, r is the radius of curvature with a respective sub number indicating the surfaces from the object to image side along the optical axis, d represents the axial distance and includes both air spaces and the actual thickness of the lens elements along the optical axis, N equals the refractive index and again, the sub numbers refer to the particular optical element from the object to the image side, and finally, $\nu$ equals the Abbe number and the sub numbers refer to the specific lens elements from the object to the image side. The asterisk (*) represents the aspheric surface, and its coefficients are shown at the bottom of respective Tables.

Here, the aspheric coefficients A, B, C, D, E, F, are defined by the following equation;

$$X = Y^2/[r_i + r_i\{1-(Y/r_i)^2\}^{\frac{1}{2}}] + AY^2 + BY^4 + CY^6 + DY^8 + EY^{10} + FY^{12} + \cdots$$

wherein $r_i$ represents the paraxial radius of curvature of the basic spheric surface, X represents the coordinate along the optical surface measured from the top of the basic surface, and Y represents the coordinate perpendicular to the optical axis measured from the optical axis. All of the parameters shown in Tables 1 to 6 are represented as the values in temperature of 20° C. Additionally, in Tables 1 to 6, the asterisk (*) represents that the lens element is made of a synthetic resin material.

Furthermore, the following TABLES 7 and 8 represent the changes of back focal length of the first to sixth embodiments in the short and long focal length conditions with temperature. For example, in the first embodiment, the second and third lens elements ($L_2$) and ($L_3$) are made of synthetic resin materials. The change of position of the image plane of the first embodiment from temperature of 20° C. to that of 50° C. in the short focal length condition is −0.175 mm. Therefore, the change of back focal length per −10° C. is only 0.074 mm in the short focal length condition. On the other hand, the fourth lens element ($L_4$) is made of a synthetic resin material in the rear conversion lens group. The change of position of the image plane of the first embodiment from temperature of 20° C. to that of 50° C., and that from temperature of 20° C. to that of −10° C., are 0.013 mm and −0.015 mm, respectively, in the long focal length condition. Namely, in the first embodiment, the change of back focal length of the master lens group with temperature is controlled to a slightly large value and the change of back focal length of the whole lens system in the long focal length condition with temperature is controlled to a slightly small value. Therefore, when considering the change of axial length of the camera body with temperature, the change of back focal length of the whole lens system in the long focal length condition with temperature is controlled to a smaller value.

As can be readily appreciated, it is possible to deviate from the following embodiments of the present invention and, as will be readily understood by those skilled in the optical art, the invention is capable of many modifications and improvements within the scope and spirit thereof Accordingly, it will be understood that the invention is not to be limited by these specific embodiments, but only by the scope and spirit of the appended claims.

TABLE 1

Embodiment 1

| | | Radius of Curvature | Axial Distance | Refractive Index (Nd) | Abbe Number |
|---|---|---|---|---|---|
| | | [Master lens group] | | | |
| | | $f = 35.0$  $F_{NO} = 3.6$  $2\omega = 63.4°$ | | | |
| I | $L_1$ | $r_1$  11.02 | | | |
| | | | $d_1$ 3.93 | $N_1$ 1.78831 | $\nu_1$ 47.32 |
| | | $r_2$  24.66 | | | |
| | | | $d_2$ 1.08 | | |
| | $L_2^*$ | $r_3$  −44.10 | | | |
| | | | $d_3$ 1.30 | $N_2$ 1.5840 | $\nu_2$ 31.0 |
| | | $r_4$  9.35 | | | |
| | | | $d_4$ 1.93 | | |
| | $L_3^*$ | $r_5$  18.26 | | | |
| | | | $d_5$ 2.15 | $N_3$ 1.4914 | $\nu_3$ 57.8 |
| | | $r_6$  −18.26 | | | |
| | | | $d_6$ 1.10 | | |
| | | $r_7$  (aperture) | | | |
| | | [Master lens group + Rear conversion lens group] | | | |
| | | $f = 48.5$  $F_{NO} = 5.6$  $2\omega = 48.0°$ | | | |
| I | $L_1$ | $r_1$  11.02 | | | |
| | | | $d_1$ 3.93 | $N_1$ 1.78831 | $\nu_1$ 47.32 |
| | | $r_2$  24.66 | | | |
| | | | $d_2$ 1.08 | | |
| | $L_2^*$ | $r_3$  −44.10 | | | |
| | | | $d_3$ 1.30 | $N_2$ 1.5840 | $\nu_2$ 31.0 |
| | | $r_4$  9.35 | | | |
| | | | $d_4$ 1.93 | | |
| | $L_3^*$ | $r_5$  18.26 | | | |
| | | | $d_5$ 2.15 | $N_3$ 1.4914 | $\nu_3$ 57.8 |
| | | $r_6$  −18.26 | | | |
| | | | $d_6$ 1.10 | | |
| | | $r_7$  (aperture) | | | |
| | | | $d_7$ 1.80 | | |
| II | $L_4^*$ | $r_8$  5000.0 | | | |
| | | | $d_8$ 1.60 | $N_4$ 1.5840 | $\nu_4$ 31.0 |
| | | $r_9$  −24.13 | | | |
| | | | $d_9$ 1.50 | | |
| | | $r_{10}$  −18.96 | | | |
| | $L_5$ | | $d_{10}$ 1.00 | $N_5$ 1.72000 | $\nu_5$ 52.14 |
| | | $r_{11}$  307.38 | | | |

$\phi_a/\phi_M = -0.43$
$\phi_b/\phi_R = -1.67$

TABLE 2

Embodiment 2

| | | Radius of Curvature | Axial Distance | Refractive Index (Nd) | Abbe Number |
|---|---|---|---|---|---|
| | | [Master lens group] | | | |
| | | $f = 39.0$  $F_{NO} = 2.88$  $2\omega = 58.0°$ | | | |
| | $L_1$ | $r_1$  12.91 | | | |
| | | | $d_1$ 4.10 | $N_1$ 1.77250 | $\nu_1$ 49.77 |
| | | $r_2$  39.93 | | | |
| | | | $d_2$ 1.00 | | |
| | $L_2^*$ | $r_3$  −77.92 | | | |
| | | | $d_3$ 2.02 | $N_2$ 1.5840 | $\nu_2$ 31.0 |
| | | $r_4$  12.05 | | | |
| | | | $d_4$ 2.29 | | |

TABLE 2-continued

Embodiment 2

| | | Radius of Curvature | Axial Distance | Refractive Index (Nd) | Abbe Number |
|---|---|---|---|---|---|
| I | $L_3^*$ | $r_5$  −29.34 | | | |
| | | | $d_5$ 2.23 | $N_3$ 1.4914 | $\nu_3$ 57.8 |
| | | $r_6$  −15.76 | | | |
| | | | $d_6$ 0.33 | | |
| | $L_4^*$ | $r_7$  14.57 | | | |
| | | | $d_7$ 2.21 | $N_4$ 1.4914 | $\nu_4$ 57.8 |
| | | $r_8$#  29.10 | | | |
| | | | $d_8$ 2.00 | | |
| | | $r_9$  (aperture) | | | |
| | | [Master lens group + Rear conversion lens group] | | | |
| | | $f = 58.5$  $F_{NO} = 4.3$  $2\omega = 40.5°$ | | | |
| | $L_1$ | $r_1$  12.91 | | | |
| | | | $d_1$ 4.10 | $N_1$ 1.77250 | $\nu_1$ 49.77 |
| | | $r_2$  39.93 | | | |
| | | | $d_2$ 1.00 | | |
| | $L_2^*$ | $r_3$  −77.92 | | | |
| | | | $d_3$ 2.02 | $N_2$ 1.5840 | $\nu_2$ 31.0 |
| | | $r_4$  12.05 | | | |
| | | | $d_4$ 2.29 | | |
| I | $L_3^*$ | $r_5$  −29.34 | | | |
| | | | $d_5$ 2.23 | $N_3$ 1.4914 | $\nu_3$ 57.8 |
| | | $r_6$  −15.76 | | | |
| | | | $d_6$ 0.33 | | |
| | $L_4^*$ | $r_7$  14.57 | | | |
| | | | $d_7$ 2.21 | $N_4$ 1.4914 | $\nu_4$ 57.8 |
| | | $r_8$#  29.10 | | | |
| | | | $d_8$ 2.00 | | |
| | | $r_9$  (aperture) | | | |
| | | | $d_9$ 1.40 | | |
| | $L_5^*$ | $r_{10}$  500.0 | | | |
| | | | $d_{10}$ 1.87 | $N_5$ 1.4914 | $\nu_5$ 31.0 |
| | | $r_{11}$  −16.0 | | | |
| | | | $d_{11}$ 1.27 | | |
| II | $L_6^*$ | $r_{12}$  −15.03 | | | |
| | | | $d_{12}$ 1.04 | $N_6$ 1.7883 | $\nu_6$ 47.32 |
| | $L_7^*$ | $r_{13}$  −7.71 | | | |
| | | | $d_{13}$ 3.00 | $N_7$ 1.8050 | $\nu_7$ 39.71 |
| | | $r_{14}$  5194.1 | | | |

Aspherical coefficients ($r_8$):
A = 0.0
B = 0.58312 × 10$^{-4}$
C = −0.18505 × 10$^{-5}$
D = 0.97888 × 10$^{-7}$
E = −0.13316 × 10$^{-8}$ $\phi_a/\phi_M = -0.59$
$\phi_b/\phi_R = -1.90$

TABLE 3

Embodiment 3

| | | Radius of Curvature | Axial Distance | Refractive Index (Nd) | Abbe Number |
|---|---|---|---|---|---|
| | | [Master lens group] | | | |
| | | $f = 39.0$  $F_{NO} = 2.88$  $2\omega = 58.0°$ | | | |
| | $L_1$ | $r_1$  14.23 | | | |
| | | | $d_1$ 4.12 | $N_1$ 1.78831 | $\nu_1$ 47.32 |
| | | $r_2$  35.36 | | | |
| | | | $d_2$ 1.25 | | |
| | $L_2^*$ | $r_3$  −51.07 | | | |
| | | | $d_3$ 2.10 | $N_2$ 1.5840 | $\nu_2$ 31.0 |
| | | $r_4$  15.22 | | | |
| | | | $d_4$ 2.14 | | |
| I | $L_3^*$ | $r_5$  −29.30 | | | |
| | | | $d_5$ 2.34 | $N_3$ 1.4914 | $\nu_3$ 57.8 |
| | | $r_6$  −14.98 | | | |
| | | | $d_6$ 0.33 | | |
| | $L_4^*$ | $r_7$  14.62 | | | |
| | | | $d_7$ 2.22 | $N_4$ 1.4914 | $\nu_4$ 57.8 |
| | | $r_8$#  31.78 | | | |
| | | | $d_8$ 2.00 | | |
| | | $r_9$  (aperture) | | | |
| | | [Master lens group + Rear conversion lens group] | | | |
| | | $f = 58.5$  $F_{NO} = 4.3$  $2\omega = 40.5°$ | | | |
| | $L_1$ | $r_1$  14.23 | | | |
| | | | $d_1$ 4.12 | $N_1$ 1.78831 | $\nu_1$ 47.32 |
| | | $r_2$  35.36 | | | |
| | | | $d_2$ 1.25 | | |
| | | $r_3$  −51.07 | | | |

TABLE 3-continued

Embodiment 3

|   |     |          |            |           |           |
|---|-----|----------|------------|-----------|-----------|
| I | $L_2$* | $r_4$ 15.22 | $d_3$ 2.10 | $N_2$ 1.5840 | $\nu_2$ 31.0 |
|   |     |          | $d_4$ 2.14 |           |           |
|   | $L_3$* | $r_5$ −29.30 | $d_5$ 2.34 | $N_3$ 1.4914 | $\nu_3$ 57.8 |
|   |     | $r_6$ −14.98 | $d_6$ 0.33 |           |           |
|   | $L_4$* | $r_7$ 14.62 | $d_7$ 2.22 | $N_4$ 1.4914 | $\nu_4$ 57.8 |
|   |     | $r_8$# 31.78 | $d_8$ 2.00 |           |           |
|   |     | $r_9$ (aperture) | $d_9$ 1.40 |     |           |
| II | $L_5$* | $r_{10}$# −100.0 | $d_{10}$ 1.72 | $N_5$ 1.5840 | $\nu_5$ 31.0 |
|   |     | $r_{11}$ −22.00 | $d_{11}$ 2.54 |     |           |
|   | $L_6$ | $r_{12}$ −11.35 | $d_{12}$ 0.80 | $N_6$ 1.80500 | $\nu_6$ 40.97 |
|   |     | $r_{13}$ −89.79 | $d_{13}$ 0.17 |     |           |
|   | $L_7$ | $r_{14}$ −132.01 | $d_4$ 2.52 | $N_7$ 1.54072 | $\nu_7$ 47.22 |
|   |     | $r_{15}$ −20.17 |          |           |           |

Aspherical coefficients ($r_8$):
A = 0.0
B = 0.33431 × 10$^{-4}$
C = 0.10377 × 10$^{-5}$
D = −0.53948 × 10$^{-7}$
E = 0.10882 × 10$^{-8}$ Aspherical coefficients ($r_{10}$):
A = 0.0
B = 0.60595 × 10$^{-4}$
C = 0.53672 × 10$^{-8}$
D = 0.18969 × 10$^{-7}$
E = 0.49203 × 10$^{-12}$ $\phi_a/\phi_M = -0.23$
$\phi_b/\phi_R = -1.50$

TABLE 4

Embodiment 4

| | | Radius of Curvature | Axial Distance | Refractive Index (Nd) | Abbe Number |
|---|---|---|---|---|---|
| | | [Master lens group] f = 35.0  $F_{NO}$ = 3.6  $2\omega$ = 63.4° | | | |
| I | $L_1$ | $r_1$ 11.02 | $d_1$ 3.93 | $N_1$ 1.78831 | $\nu_1$ 47.32 |
|   |     | $r_2$ 24.66 | $d_2$ 1.08 |           |           |
|   | $L_2$* | $r_3$ −44.10 | $d_3$ 1.30 | $N_2$ 1.5840 | $\nu_2$ 31.0 |
|   |     | $r_4$ 9.35 | $d_4$ 1.93 |           |           |
|   | $L_3$* | $r_5$ 18.26 | $d_5$ 2.15 | $N_3$ 1.4914 | $\nu_3$ 57.8 |
|   |     | $r_6$ −18.26 | $d_6$ 1.10 |           |           |
|   |     | $r_7$ (aperture) |       |           |           |

[Master lens group + Rear conversion lens group] f = 68.0  $F_{NO}$ = 7.0  $2\omega$ = 35.3°

| | | | | | |
|---|---|---|---|---|---|
| I | $L_1$ | $r_1$ 11.02 | $d_1$ 3.93 | $N_1$ 1.78831 | $\nu_1$ 47.32 |
|   |     | $r_2$ 24.66 | $d_2$ 1.08 |           |           |
|   | $L_2$* | $r_3$ −44.10 | $d_3$ 1.30 | $N_2$ 1.5840 | $\nu_2$ 31.0 |
|   |     | $r_4$ 9.35 | $d_4$ 1.93 |           |           |
|   | $L_3$* | $r_5$ 18.26 | $d_5$ 2.15 | $N_3$ 1.4914 | $\nu_3$ 57.8 |
|   |     | $r_6$ −18.26 | $d_6$ 1.10 |           |           |
|   |     | $r_7$ (aperture) | $d_7$ 1.70 |       |           |
|   | $L_4$* | $r_8$ −500.0 | $d_8$ 1.85 | $N_4$ 1.5840 | $\nu_4$ 31.0 |
|   |     | $r_9$ −25.00 |       |           |           |

TABLE 4-continued

Embodiment 4

| | | Radius of Curvature | Axial Distance | Refractive Index (Nd) | Abbe Number |
|---|---|---|---|---|---|
| | | | $d_9$ 0.93 | | |
| II | $L_5$ | $r_{10}$ −25.26 | $d_{10}$ 1.00 | $N_5$ 1.85000 | $\nu_5$ 40.51 |
|    |       | $r_{11}$ 30.54 | $d_{11}$ 0.72 |       |           |
|    | $L_6$ | $r_{12}$ 19.34 | $d_{12}$ 2.59 | $N_6$ 1.59270 | $\nu_6$ 35.30 |
|    |       | $r_{13}$ −13.37 | $d_{13}$ 1.05 |       |           |
|    | $L_7$ | $r_{14}$ −11.77 | $d_{14}$ 0.67 | $N_7$ 1.80500 | $\nu_7$ 40.97 |
|    |       | $r_{15}$ −369.65 |         |           |           |

$\phi_a/M = -0.43$
$\phi_b/R = -0.83$

TABLE 5

Embodiment 5

| | | Radius of Curvature | Axial Distance | Refractive Index (Nd) | Abbe Number |
|---|---|---|---|---|---|
| | | [Master lens group] f = 35.0  $F_{NO}$ = 2.6  $2\omega$ = 63.4° | | | |
| I | $L_1$ | $r_1$ 11.965 | $d_1$ 4.50 | $N_1$ 1.69680 | $\nu_1$ 56.47 |
|   |     | $r_2$ 24.785 | $d_2$ 1.80 |           |           |
|   | $L_2$ | $r_3$ −35.651 | $d_3$ 1.20 | $N_2$ 1.64769 | $\nu_2$ 33.88 |
|   |     | $r_4$ 11.098 | $d_4$ 1.10 |           |           |
|   | $L_3$ | $r_5$ 19.423 | $d_5$ 4.00 | $N_3$ 1.77250 | $\nu_3$ 49.77 |
|   |     | $r_6$ −19.423 | $d_6$ 0.15 |           |           |
|   | $L_4$* | $r_7$# −28.159 | $d_7$ 1.30 | $N_4$ 1.49140 | $\nu_4$ 57.82 |
|   |     | $r_8$ −91.526 | $d_8$ 1.30 |           |           |
|   |     | $r_9$ (aperture) |     |           |           |

[Master lens group + Rear conversion lens group] f = 68.0  $R_{NO}$ = 5.0  $2\omega$ = 35.3°

| | | | | | |
|---|---|---|---|---|---|
| I | $L_1$ | $r_1$ 11.965 | $d_1$ 4.50 | $N_1$ 1.69680 | $\nu_1$ 56.47 |
|   |     | $r_2$ 24.785 | $d_2$ 1.80 |           |           |
|   | $L_2$ | $r_3$ −35.651 | $d_3$ 1.20 | $N_2$ 1.64769 | $\nu_2$ 33.88 |
|   |     | $r_4$ 11.098 | $d_4$ 1.10 |           |           |
|   | $L_3$ | $r_5$ 19.423 | $d_5$ 4.00 | $N_3$ 1.77250 | $\nu_3$ 49.77 |
|   |     | $r_6$ −19.423 | $d_6$ 0.15 |           |           |
|   | $L_4$* | $r_7$# −28.159 | $d_7$ 1.30 | $N_4$ 1.49140 | $\nu_4$ 57.82 |
|   |     | $r_8$ −91.526 | $d_8$ 1.30 |           |           |
|   |     | $r_9$ (aperture) | $d_9$ 1.80 |       |           |
| II | $L_5$* | $r_{10}$# −3334.333 | $d_{10}$ 1.90 | $N_5$ 1.58400 | $\nu_5$ 31.00 |
|    |       | $r_{11}$ −18.682 | $d_{11}$ 1.00 |       |           |
|    | $L_6$ | $r_{12}$ −14.322 | $d_{12}$ 2.43 | $N_6$ 1.59270 | $\nu_6$ 35.29 |
|    |       | $r_{13}$ −6.557 | $d_{13}$ 1.22 |       |           |
|    | $L_7$ | $r_{14}$ −38.379 |         | $N_7$ 1.85000 | $\nu_7$ 40.04 |

Aspherical coefficients ($r_7$):
A = 0.0
B = −0.12491 × 10$^{-4}$
C = 0.42177 × 10$^{-7}$
D = 0.11229 × 10$^{-7}$
E = 0.44337 × 10$^{-12}$
F = −0.85153 × 10$^{-16}$ Aspherical coefficients ($r_{10}$):

TABLE 5-continued

Embodiment 5

A = 0.0
B = 0.12975 × $10^{-3}$
C = 0.16095 × $10^{-5}$
D = −0.27366 × $10^{-7}$
E = −0.23507 × $10^{-11}$
F = −0.43704 × $10^{-14}$ $\phi_a/\phi_M = -0.42$
$\phi_b/\phi_R = -1.24$

TABLE 6

Embodiment 6

[Master lens group]
f = 35.0  $F_{NO}$ = 2.6  2ω = 63.4°

| | | Radius of Curvature | Axial Distance | Refractive Index (Nd) | Abbe Number |
|---|---|---|---|---|---|
| I | L₁ | r₁ 11.300 | | | |
| | | | d₁ 5.00 | N₁ 1.69680 | ν₁ 56.47 |
| | | r₂ 24.663 | | | |
| | | | d₂ 1.52 | | |
| | L₂ | r₃ −47.034 | | | |
| | | | d₃ 1.15 | N₂ 1.67270 | ν₂ 32.22 |
| | | r₄ 10.029 | | | |
| | | | d₄ 0.95 | | |
| | L₃ | r₅ 17.534 | | | |
| | | | d₅ 4.00 | N₃ 1.75700 | ν₃ 47.73 |
| | | r₆ −17.534 | | | |
| | | | d₆ 0.10 | | |
| | L₄* | r₇# −20.071 | | | |
| | | | d₇ 1.30 | N₄ 1.49140 | ν₄ 57.82 |
| | | r₈ −91.526 | | | |
| | | | d₈ 1.30 | | |
| | | r₉ (aperture) | | | |

[Master lens group + Rear conversion lens group]
f = 53.5  $F_{NO}$ = 4.0  2ω = 44.0°

| | | Radius of Curvature | Axial Distance | Refractive Index (Nd) | Abbe Number |
|---|---|---|---|---|---|
| I | L₁ | r₁ 11.300 | | | |
| | | | d₁ 5.00 | N₁ 1.69680 | ν₁ 56.47 |
| | | r₂ 24.663 | | | |
| | | | d₂ 1.52 | | |
| | L₂ | r₃ −47.034 | | | |
| | | | d₃ 1.15 | N₂ 1.67270 | ν₂ 32.22 |
| | | r₄ 10.029 | | | |
| | | | d₄ 0.95 | | |
| | L₃ | r₅ 17.534 | | | |
| | | | d₅ 4.00 | N₃ 1.75700 | ν₃ 47.73 |
| | | r₆ −17.534 | | | |
| | | | d₆ 0.10 | | |
| | L₄* | r₇# −20.071 | | | |
| | | | d₇ 1.30 | N₄ 1.49140 | ν₄ 57.82 |
| | | r₈ −91.526 | | | |
| | | | d₈ 1.30 | | |
| | | r₉ (aperture) | | | |
| | | | d₉ 1.80 | | |
| II | L₅ | r₁₀# 84.559 | | | |
| | | | d₁₀ 2.00 | N₅ 1.58400 | ν₅ 31.00 |
| | | r₁₁ −15.197 | | | |
| | | | d₁₁ 1.00 | | |
| | L₆ | r₁₂ −9.375 | | | |
| | | | d₁₂ 2.49 | N₆ 1.59270 | ν₆ 35.29 |
| | | r₁₃ −7.349 | | | |
| | L₇ | | d₃ 6.50 | N₇ 1.90060 | ν₇ 37.76 |
| | | r₁₄ −25.307 | | | |

Aspherical coefficients (r₇):
A = 0.0
B = −0.99057 × $10^{-5}$
C = −0.37897 × $10^{-6}$
D = 0.19095 × $10^{-7}$
E = 0.53082 × $10^{-12}$
F = −0.98690 × $10^{-16}$ Aspherical coefficients (r₁₀):
A = 0.0
B = 0.15230 × $10^{-3}$
C = 0.57175 × $10^{-5}$
D = −0.35672 × $10^{-7}$
E = −0.61445 × $10^{-11}$

TABLE 6-continued

Embodiment 6

F = −0.58938 × $10^{-14}$ $\phi_a/\phi_M = 0.59$
$\phi_b/\phi_R = -3.17$

TABLE 7

Back focal length of master lens group
(short focal length condition)

| Temperature | 50° C. | 20° C. | −10° C. |
|---|---|---|---|
| Embodiment 1 | 26.178 | 26.253 | 26.327 |
| Embodiment 2 | 26.393 | 26.531 | 26.669 |
| Embodiment 3 | 27.914 | 27.975 | 28.035 |
| Embodiment 4 | 26.174 | 26.253 | 26.327 |
| Embodiment 5 | 24.965 | 25.053 | 25.143 |
| Embodiment 6 | 23.462 | 23.584 | 23.706 |
| | | | (mm) |

TABLE 8

Back focal length of whole lens system including
master lens group and rear conversion lens group
(long focal length condition)

| Temperature | 50° C. | 20° C. | −10° C. |
|---|---|---|---|
| Embodiment 1 | 28.533 | 28.520 | 28.505 |
| Embodiment 2 | 30.240 | 30.203 | 30.161 |
| Embodiment 3 | 32.524 | 32.429 | 32.331 |
| Embodiment 4 | 35.313 | 35.252 | 35.184 |
| Embodiment 5 | 37.055 | 36.965 | 36.873 |
| Embodiment 6 | 26.080 | 26.033 | 25.986 |
| | | | (mm) |

What is claimed is:

1. A passive automatic temperature corrected focal length changeable lens system having an optical axis, comprising:
   a master lens group of a positive refractive power having at least one first lens element made of a synthetic resin material, and
   a rear lens group of a negative refractive power retractably positioned on the image side of the master lens group on the optical axis and having at least one second lens element made of a synthetic resin material, and having an opposite power to the first lens element, the synthetic resin materials of the first and second lens elements being complementarily responsive to any temperature change within a predetermined range of temperature that a user may experience, the respective positions of the first and second lens elements and their groups along this optical axis and the specific refractive powers for each of the synthetic resin lens elements enable a temperature compensation for the predetermined temperature range, without a corresponding relative movement imposed on the first and second lens elements along the optical axis, wherein any temperature change in position of an image plane introduced by one synthetic resin lens element is compensated by the corresponding temperature responsive change introduced by the other synthetic resin lens element.

2. The lens system as claimed in claim 1, wherein the first synthetic resin lens element has a negative refractive power and the second synthetic resin lens element has a positive refractive power.

3. The lens system as claimed in claim 2, wherein the lens system fulfills the following conditions in a predetermined standard temperature;

$$-0.3 > \phi_b/\phi_R > -4.0$$

$$-0.1 > \phi_a/\phi_M > -0.7$$

wherein;
- $\phi_a$ represents compound refractive power of the lens elements made of synthetic resin material in the master lens group;
- $\phi_b$ represents compound refractive power of the lens elements made of synthetic resin material in the rear conversion lens group;
- $\phi_M$ represents compound refractive power of the master lens group; and
- $\phi_R$ represents compound refractive power of the rear conversion lens group.

4. The lens system as claimed in claim 2, wherein the master lens group includes, from the object side, a first positive lens element, a second negative lens element made of a synthetic resin material, and a third positive lens element made of a synthetic resin material, the compound refractive power of the second and third lens elements being negative, and wherein the rear conversion lens group includes, from the object side, a fourth positive lens element made of a synthetic resin material, and a fifth negative lens element.

5. A focal length changeable lens system comprising:
a master lens group of a positive refractive power having at least one negative lens element made of a synthetic resin material, and
a rear conversion lens group of a negative refractive power retractably arranged on the image side of the master lens group and having at least one positive lens element made of a synthetic resin material wherein the lens system fulfills the following conditions in a predetermined standard temperature;

$$-0.3 > \phi_b/\phi_R > -4.0$$

$$-0.1 > \phi_a/\phi_M > -0.7$$

wherein:
- $\phi_a$ represents compound refractive power of the lens elements made of synthetic resin material in the master lens group;
- $\phi_b$ represents compound refractive power of the lens elements made of synthetic resin material in the rear conversion lens group;
- $\phi_M$ represents compound refractive power of the master lens group; and
- $\phi_R$ represents compound refractive power of the rear conversion lens group.

6. A focal length changeable lens system comprising a master lens group and a rear conversion lens group retractably arranged on the image side of the master lens group, wherein the lens system is defined by the following design parameters:

| [Master lens group] | | | |
|---|---|---|---|
| f = 35.0 | $F_{NO}$ = 3.6 | 2ω = 63.4° | |
| Radius of Curvature | Axial Distance | Refractive Index (Nd) | Abbe Number |
| $r_1$ 11.02 | | | |
| | $d_1$ 3.93 | $N_1$ 1.78831 | $\nu_1$ 47.32 |
| $r_2$ 24.66 | | | |
| | $d_2$ 1.08 | | |
| $r_3$ −44.10 | | | |
| | $d_3$ 1.30 | $N_2$ 1.5840 | $\nu_2$ 31.0 |
| $r_4$ 9.35 | | | |
| | $d_4$ 1.93 | | |
| $r_5$ 18.26 | | | |
| | $d_5$ 2.15 | $N_3$ 1.4914 | $\nu_3$ 57.8 |
| $r_6$ −18.26 | | | |
| | $d_6$ 1.10 | | |
| $r_7$ (aperture) | | | |

| [Master lens group + Rear conversion lens group] | | | |
|---|---|---|---|
| f = 48.5 | $F_{NO}$ = 5.6 | 2ω = 48.0° | |
| Radius of Curvature | Axial Distance | Refractive Index (Nd) | Abbe Number |
| $r_1$ 11.02 | | | |
| | $d_1$ 3.93 | $N_1$ 1.78831 | $\nu_1$ 47.32 |
| $r_2$ 24.66 | | | |
| | $d_2$ 1.08 | | |
| $r_3$ −44.10 | | | |
| | $d_3$ 1.30 | $N_2$ 1.5840 | $\nu_2$ 31.0 |
| $r_4$ 9.35 | | | |
| | $d_4$ 1.93 | | |
| $r_5$ 18.26 | | | |
| | $d_5$ 2.15 | $N_3$ 1.4914 | $\nu_3$ 57.8 |
| $r_6$ −18.26 | | | |
| | $d_6$ 1.10 | | |
| $r_7$ (aperture) | | | |
| | $d_7$ 1.80 | | |
| $r_8$ 5000.0 | | | |
| | $d_8$ 1.60 | $N_4$ 1.5840 | $\nu_4$ 31.0 |
| $r_9$ −24.13 | | | |
| | $d_9$ 1.50 | | |
| $r_{10}$ −18.96 | | | |
| | $d_{10}$ 1.00 | $N_5$ 1.72000 | $\nu_5$ 52.14 |
| $r_{11}$ 307.38 | | | |

\* \* \* \* \*